(No Model.)
J. T. GILBERT.
WAGON JACK.
No. 286,291. Patented Oct. 9, 1883.
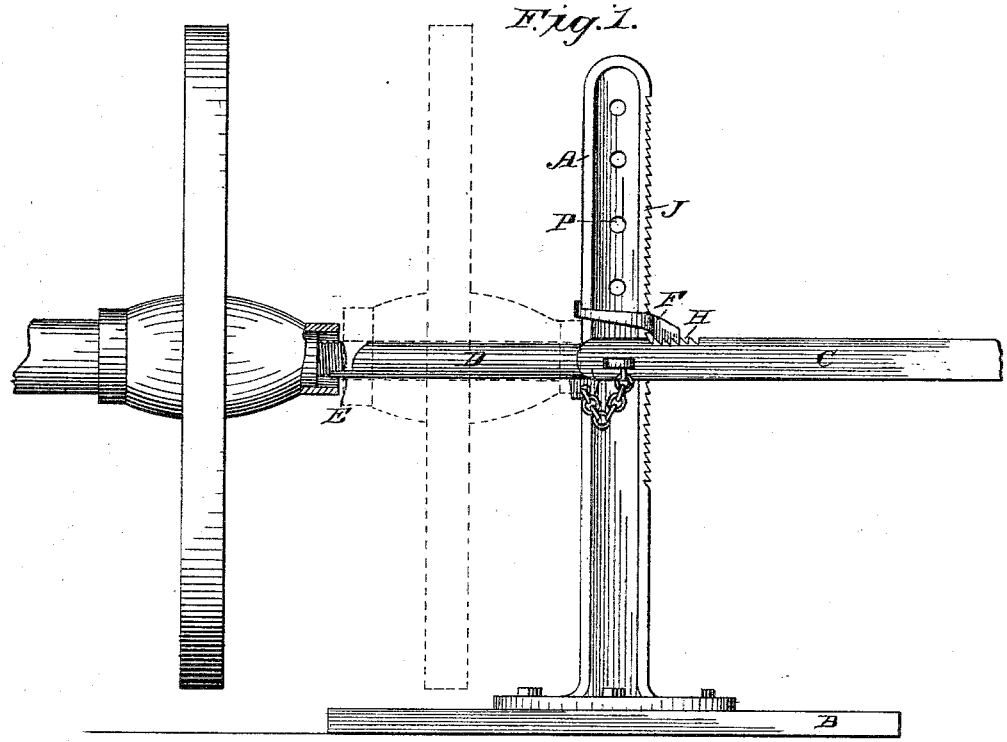
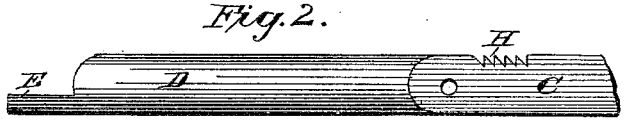
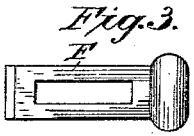
Attest:
Wm. J. Tanner
Geo. T. Smallwood
Inventor
John T. Gilbert

UNITED STATES PATENT OFFICE.

JOHN T. GILBERT, OF MENDOTA, ILLINOIS.

WAGON-JACK.

SPECIFICATION forming part of Letters Patent No. 286,291, dated October 9, 1883.

Application filed March 16, 1883. (No model.)

*To all whom it may concern:*

Be it known that I, JOHN T. GILBERT, a citizen of the United States, residing in Mendota, in the county of La Salle and State of Illinois, have invented a new and useful Improvement in Wagon-Jacks, of which the following is a specification, reference being had to the accompanying drawings, illustrating my invention, in which—

Figure 1 is a vertical section of the jack. Fig. 2 is a plan view of the lever. Fig. 3 is a plan view of the pawl. Fig. 4 is a plan view of the portion of the lever which engages the end of the axle.

The nature of my invention relates to wagon-jacks of the kind that raise the axle by its end outside of the wheel; and it consists of a peculiar-shaped end to the portion of the lever which comes in contact with the under side of the end of the axle, and is made concave inside, so as to conform to the shape of the end of the axle, which is always round. It is also made so thin that the wheel will readily glide over it, if desired, thus readily exposing the axle to the operator.

Like letters of reference refer to like parts of the several views.

A further and more full description of my invention is as follows: The standard of the jack is an iron bar, A, provided with lugs P P, which are bolted to base B, which is longer on the side next to vehicle, so as to give it a firmer support. The lever C is made like any ordinary lever, except at the lifting end D, which is entirely different, having a lifter, E, at the end, so formed as to conform to the under side of the screw end of an axle and parallel with the same, and still so thin as to allow the wheel to glide over it by a simple movement of the hand. F represents a piece of iron in the shape of a pawl, so formed as to drop into ratchet H on lever C, and kept in its place by the teeth I in standard A. The holes K in standard A are to receive the bolt lever C works on, if it is desirable to move it up or down. As, the pawl F encircles the standard A, it will always adapt itself to the position of lever C.

I am aware that previous to this date wagon-jacks have been in use to raise axles at the end and allow the wheel to glide on the elevating-arm, and especially so as I was the originator of the device, and secured a patent for the same, dated November 14, 1882, No. 267,330; but I am not aware that prior to this the elevating arm and lever were one and the same. The benefit to be derived from this simple combination is simplicity and economy.

This application is a simple improvement on my application filed June 26, 1883, No. 99,256.

What I claim as my invention, and desire to secure by Letters Patent, is—

The end E on lifter D at the end of lever C, with pawl B, in combination with standard A, as and for the purpose specified.

JOHN T. GILBERT.

Witnesses:
F. W. SCHULTZ,
A. SCHULTZ.